United States Patent [19]

Brandt

[11] Patent Number: 5,449,647

[45] Date of Patent: Sep. 12, 1995

[54] SILICON CARBIDE WHISKER REINFORCED CUTTING TOOL MATERIAL

[75] Inventor: Gunnar Brandt, Solna, Sweden

[73] Assignee: Sandvik AB, Sandviken, Sweden

[21] Appl. No.: 246,135

[22] Filed: May 19, 1994

[30] Foreign Application Priority Data

Jan. 21, 1994 [DE] Germany .................. 94 00 187.2

[51] Int. Cl.⁶ .................. C04B 35/117; C04B 35/577
[52] U.S. Cl. ............................. 501/95; 501/89; 501/128; 51/309
[58] Field of Search ............... 501/89, 95, 127, 128; 51/309

[56] References Cited

U.S. PATENT DOCUMENTS

| | | |
|---|---|---|
| 492,767 | 2/1893 | Acheson . |
| 560,291 | 5/1896 | Acheson . |
| 718,892 | 1/1903 | Acheson . |
| 722,792 | 3/1903 | Acheson . |
| 722,793 | 3/1903 | Acheson . |
| 723,631 | 3/1903 | Acheson . |
| 1,028,303 | 6/1912 | Tone . |
| 2,294,056 | 4/1940 | Thompson . |
| 2,979,414 | 4/1961 | Rijshkewitch et al. . |
| 3,335,049 | 8/1967 | Pultz . |
| 3,386,840 | 1/1968 | Gruber . |
| 3,407,090 | 10/1968 | Hertl . |
| 3,459,842 | 8/1969 | Wakefield . |
| 3,507,632 | 4/1970 | Swoboda et al. . |
| 3,541,672 | 11/1970 | Hulse . |
| 3,575,789 | 4/1971 | Siefert et al. . |
| 3,813,340 | 8/1974 | Knippenberg et al. . |
| 3,833,389 | 9/1974 | Korreya et al. . |
| 3,933,984 | 1/1976 | Kimura et al. . |
| 3,972,161 | 8/1976 | Zoiss . |
| 4,044,934 | 1/1977 | Prochazka . |
| 4,060,412 | 11/1977 | Divecha . |
| 4,063,908 | 11/1977 | Ogawa et al. . |
| 4,097,293 | 6/1978 | Komega et al. . |
| 4,158,687 | 6/1979 | Yajima et al. . |
| 4,218,253 | 8/1980 | Dworak et al. . |
| 4,240,835 | 12/1980 | Laskow et al. . |
| 4,259,112 | 3/1981 | Dolowy, Jr. et al. . |
| 4,280,973 | 7/1981 | Moskowitz et al. . |

(List continued on next page.)

FOREIGN PATENT DOCUMENTS

| | | |
|---|---|---|
| 0767030 | 11/1971 | Belgium . |
| 67584 | 12/1982 | European Pat. Off. . |
| 85744 | 8/1983 | European Pat. Off. . |
| 194811 | 9/1986 | European Pat. Off. . |
| 202504 | 11/1986 | European Pat. Off. . |
| 208910 | 1/1987 | European Pat. Off. . |
| 0351134 | 1/1990 | European Pat. Off. . |
| 579587 | 1/1994 | European Pat. Off. . |
| 47803 | 1/1972 | Japan . |
| 48-027891 | 4/1973 | Japan . |
| 48-30803 | 4/1973 | Japan . |
| 49-40121 | 10/1974 | Japan . |
| 52-47803 | 4/1977 | Japan . |
| 53-27517 | 8/1978 | Japan . |
| 56-92180 | 7/1981 | Japan . |

(List continued on next page.)

OTHER PUBLICATIONS

"Toughening Behavior in SiC-Whisker-Reinforced Alumina", Becher et al., Metals and Ceramics Div., Oak Ridge National Laboratory, Oak Ridge, TN 37831 Dec. 1984.

"Development of SiC-Whisker-Reinforced Ceramics", Wei et al., Oak Ridge National Lab., Oak Ridge, TN 37830, Ceramic Bulletin, vol. 64, No. 2 (1985) no month.

"Alumina Ceramic Tools, Mitsuhiko Furukawa", Nippon Tungsten Co., Ltd., Fukuoka, Japan, Ceramic Bulletin, vol. 62, No. 12 (1983) pp. 1384–1387 no month.

"Summary of Japan's Innovative Industrial Materials", (List continued on next page.)

*Primary Examiner*—Karl Group
*Attorney, Agent, or Firm*—Burns, Doane, Swecker & Mathis

[57] ABSTRACT

There is now provided an oxide based ceramic cutting insert for chipforming machining of heat resistant alloys comprising a ceramic oxide based matrix and 5–50% by volume of homogeneously dispersed whiskers of silicon carbide. The whiskers have an average length of 4–7 $\mu$m, with substantially all of the whiskers having a length less than 10 $\mu$m.

15 Claims, No Drawings

U.S. PATENT DOCUMENTS

| | | |
|---|---|---|
| 4,284,612 | 8/1981 | Horne, Jr. et al. . |
| 4,314,852 | 2/1982 | Brennan et al. . |
| 4,320,203 | 3/1982 | Brandt et al. . |
| 4,323,323 | 4/1982 | Lumby et al. . |
| 4,324,843 | 4/1982 | Brennan et al. . |
| 4,332,909 | 6/1982 | Nishida et al. . |
| 4,343,909 | 8/1982 | Adams et al. . |
| 4,366,254 | 12/1982 | Rich et al. . |
| 4,388,255 | 6/1983 | Simpson . |
| 4,394,231 | 7/1983 | Nicolas . |
| 4,410,635 | 10/1983 | Brennan et al. . |
| 4,412,854 | 11/1983 | Layden . |
| 4,453,343 | 6/1984 | Grimes, Sr. . |
| 4,463,058 | 7/1984 | Hood et al. . |
| 4,464,192 | 8/1984 | Layden et al. . |
| 4,485,179 | 11/1984 | Brennan et al. . |
| 4,500,504 | 2/1985 | Yamamoto . |
| 4,507,224 | 3/1985 | Toibana et al. . |
| 4,526,875 | 7/1985 | Yamamoto et al. . |
| 4,543,345 | 9/1985 | Wei . |
| 4,554,201 | 11/1985 | Andreev et al. . |
| 4,585,500 | 4/1986 | Minjolle et al. . |
| 4,657,877 | 4/1987 | Becher et al. . |
| 4,666,467 | 5/1987 | Matsamoto et al. . |
| 4,673,658 | 6/1987 | Gadkaree et al. . |
| 4,710,940 | 12/1987 | Sipes, Jr. . |
| 4,739,507 | 4/1988 | Byer et al. . |
| 4,745,091 | 5/1988 | Landingham . |
| 4,746,635 | 5/1988 | Inoue et al. ............... 501/89 |
| 4,749,667 | 6/1988 | Jun et al. ................. 501/89 |
| 4,789,277 | 12/1988 | Rhodes et al. . |
| 4,849,381 | 7/1989 | Brandt et al. . |
| 4,889,835 | 12/1989 | Niihara et al. ............ 501/89 |
| 4,916,092 | 4/1990 | Tiegs et al. . |
| 4,961,757 | 10/1990 | Rhodes et al. . |
| 4,994,416 | 2/1991 | Tiegs et al. ............ 501/89 X |
| 5,017,528 | 5/1991 | Tiegs et al. . |
| 5,059,564 | 10/1991 | Mehrotra et al. . |
| 5,123,935 | 6/1992 | Kanamoru et al. . |
| 5,177,037 | 1/1993 | Schuldies . |
| 5,246,894 | 9/1993 | Okuda et al. ............ 501/95 X |
| 5,250,477 | 10/1993 | Baldoni, II et al. . |
| 5,346,517 | 9/1994 | Collin ....................... 501/89 X |

FOREIGN PATENT DOCUMENTS

| | | |
|---|---|---|
| 57-146237 | 9/1982 | Japan . |
| 58-91073 | 5/1983 | Japan . |
| 58-48621 | 10/1983 | Japan . |
| 59-30778 | 2/1984 | Japan . |
| 59-54680 | 3/1984 | Japan . |
| 59-102861 | 6/1984 | Japan . |
| 59-102862 | 6/1984 | Japan . |
| 59-137366 | 8/1984 | Japan . |
| 60-05079 | 1/1985 | Japan . |
| 62-36991 | 2/1987 | Japan . |
| 8963969 | 3/1989 | Japan . |
| 7100577 | 2/1975 | Sweden . |
| 586166 | 3/1977 | Switzerland . |
| 954285 | 4/1964 | United Kingdom . |
| 2157282 | 10/1985 | United Kingdom . |
| 346281 | 8/1972 | U.S.S.R. . |
| 353930 | 11/1972 | U.S.S.R. . |
| 380615 | 7/1973 | U.S.S.R. . |
| 381645 | 8/1973 | U.S.S.R. . |
| 446489 | 4/1975 | U.S.S.R. . |
| 478823 | 10/1975 | U.S.S.R. . |
| 477977 | 11/1975 | U.S.S.R. . |
| 481578 | 11/1975 | U.S.S.R. . |
| 483378 | 12/1975 | U.S.S.R. . |
| 484204 | 12/1975 | U.S.S.R. . |
| 530017 | 11/1976 | U.S.S.R. . |
| 530018 | 11/1976 | U.S.S.R. . |
| 533577 | 11/1976 | U.S.S.R. . |
| 629197 | 9/1978 | U.S.S.R. . |
| 657003 | 4/1979 | U.S.S.R. . |
| WO86/05480 | 9/1986 | WIPO . |
| WO92/21635 | 12/1992 | WIPO . |

OTHER PUBLICATIONS

G. Fisher, Ceramic Bulletin, vol. 64, No. 1 (1985) pp. 34–37 no month.

1986 IR100 Competition Winners, Research & Development, Oct. 1986.

"Final Report on Development of Improved Cutting Tool Materials", Oct. 1965, AFML–TR–65–306, Whitney et al.

"New and Improved Cutting Tool Materials", Mar. 1969, AFML–TR–69–50, Whitney et al.

"Metals and Ceramics Division Progress Report", Published Sep. 1984, Oak Ridge National Laboratory.

"Preliminary Reports, Memoranda and Technical Notes of the Materials Research Council Summer Conference, Department of Materials and Metallurgical Engineering", Jul. 1984, La Jolla, Calif.

"Metals and Ceramics Div. Progress Report", Published Jan. 1986, Oak Ridge National Laboratory.

"Impact Strength of Alumina Composites", Barta, et al., Ceramic Bulletin, vol. 51, No. 5, (1972), pp. 464–470 no month.

"Fibre Reinforced Ceramics", D. C. Phillips, Materials Development Division, A.E.R.E. Harwell, England, Feb. 1981.

"High–Strength Silicon Carbide–Fibre–Reinforced Glass Matrix Composites", by K. M. Prewo et al. J. of (List continued on next page.)

OTHER PUBLICATIONS

Mat. Science, 15, pp. 463–468 (1980).

"Silicon Carbide Yarn Reinforced Glass Matrix Composites", Prewo et al., J. of Matrix Science, 17, pp. 1201–1206—1982 no month.

"Silicon Nitride Ceramic Composites with High Toughness", Lindley et al., Nature Sol 229, pp. 192–193, Jan. 15, 1971.

"Silicon Carbide Whisker–Reinforced Aluminum Composite" Am. Ceram. Soc. Meeting, Columbus, Ohio Nov. 2, 1983) Wei et al.

"Silicon Carbide Fiber Reinforced Glass–Ceramic Matrix Composites Exhibiting High Strength and Toughness", Prewo, et al. J. Material Sci., 17 (1982) 2371–2383 no month.

"Fabrication of Silicon Carbide Whisker–Silicon Nitride Composite Materials and their Physical Properties" Tamari et al., Osaka Kogyo Gijutsu Kiho, 33(2), 129–134, 1962 no month.

"Studies on the Application of Hot–Pressed Silicon Nitride Ceramics as Cutting Tools", Miao Ho–Cho et al., Ceramurgia International, vol. 6, No. 1, 1980 no month.

Chemical Engineers Handbook, 5th Ed., 1973, 21–30 to 21–36, Perry no month.

"Handbook of Fillers and Reinforcement for Plastics", Katz, et al. (1978) 446–464 no month.

"Short Fiber Reinforcement: Where the Action is", J. V. Milewski, Plastics Compounding, Nov./Dec. 1979, 17–37.

"Growth Phenomena in Silicon Carbide", Philips Research Reports v. 18, pp. 161–274 (1963), Knippenberg no month.

"Temperature Measurement in Commercial Silcon Carbide Furnaces", Trans Electrochem., Soc., v. 61, pp. 217–232 (1932) Ridgeway no month.

"A Comprehensive Treatise On Inorganic and Theoretical Chemistry", v. V, pp. 875–887 (1940), Mellor no month.

"Carbide of Silicon—Its Purpose and Use in Steel", The Iron Age, v. 63, No. 5, (1899), Tone.

"Interfaces in Alumina–SiC Whisker Composites", Ceramic Microstructures '86: Role of Interfaces, Materials Science Research Series No. 21, Plenum Press, New York (1987), Tiegs et al. no month.

"The Formation and Dissociation of Silicon Carbide", Trans, Elect. Soc., v. 68, pp. 87–109 (1935), Ruff no month.

"Deposition of Carbon on Vitreous Silica", J. Chem. Cos., pp. 1362–1366 (1948), Iley et al. no month.

"Abrasives" Chapter 9 Silicon Carbide, pp. 68–75, 166–167, Springer-Verlag, New York (1971), Coss, Jr. no month.

"Microstructures of Ceramics—Structure and Properties of Grinding Tools", pp. 118–127, 130–131, 144–149, 195–199, Akademiai Kiado, Budapest (1980), Moser, (English translation by I. Finaly), no month.

"Ceramic Composites Emerging as Advanced Structural Materials", Ron Daganl, C&EN, Washington, Feb. 1, 1988.

"SiC Whiskers, For fibrous Composite Engineering Materials", University of Wisconsin, Oct. 7–8, 1965, Shaffer no month.

"Tool and Manufacturing Engineers Handbook", Third Edition, 1976 pp. 1–25 to 1–33 and 5–17, Dallas no month.

"Whisker Technology", Army Materials and Mechanics Research Center, 1970, pp. 443–468, Levitt. no month.

"Handbook of Structural Ceramics", Skorsky Aircraft Division United Technologies Corporation, 1991, pp. 7.40 to 7.47, Schwartz no month.

"Silicon Nitride Whisker and Silicon Carbide Whisker of" Tateho Chemical Industries Co., Ltd. Tateho Chemical Industries Co., Ltd. (1984) no month.

"Silicon Carbide Whiskers, Recent Advances in Engineering Science", V, 5 pt. 1 (1970), pp. 1–17, Shaffer no month.

"Alumina as a Ceramic Material", The American Ceramic Society, (1970) pp. 131–133, Gitzen no month.

"Ceramics in Machning Process", (1966) pp. 209–301, King et al. no month.

"Rolle of $ZrO_2$ and TiC on Performance of Alumina (List continued on next page.)

OTHER PUBLICATIONS

Based Ceramic Cutting Tools", Trans. Ind. Ceramica Society, 49 (3), pp. 60–66 (1990), Basu et al. no month.

"Toolling & Production", vol. 50, No. 12, Mar. 6, 1985.

"Evaluation of Ceramic Inserts for Machining Glass 30 Gray Cast Iron", Metcut Report No. 2312-38101-1 for Arco Metal Company, Greer, South Carolina 29651, Nov. 20, 1984.

"A Competitive Assessment of the U.S. Advanced Ceramics Industry" Prepared by Industry Analysis Division, Office of Industry Assessment Trade Information and Analysis Assistant Secretary for Trade Development, Mar. 1984.

"GaAs diode-pumped Nd:YAG laser", J. Appl. Phys., vol. 43, No. 11, Nov. 1972 pp. 4603–4505, L. J. Rosenkrantz.

"Room-temperature cw operation of an efficient miniaturized Nd:YAG laser end-pumped by a superluminescent diode", Appl. Phys. Lett., vol. 29, No. 11, 1 (Dec. 1976), pp. 720–722, K. Washio et al.

"Efficient frequency-stable laser-diode-pumped Nd:YAG laser", Optics Letters, vol. 10, No. 2 (Feb. 1985) pp. 62–64, Zhou et al.

"Intracavity second-harmonic generation in a ND pentaphosphate laser", Appl. Phys. Lett., vol. 29, (1976) pp. 176–179, S. R. Chinn no month.

"Efficient Frequency-Doubled Single-Frequency Nd:YAG Laser", IEEE Journal of Quantum Electronics, vol. QE-10, No. 2, (Feb. 1974), pp. 253–262, Wm. Culshaw et al.

"High external efficiency (36% 5 micron mesa isolated GaAs quantum well laser by organometallic vapor phase epitaxy", Appl. Phys., Lett. 46, No. 2, 15 (Jan. 1985) pp. 121–123.

"Low-current-density LED-pumped Nd:YAG laser using a solid cylindrical reflector", J. Appl. Phys., vol. 45, No. 3, (Mar. 1974) pp. 1357–1371, G. I. Farmer et al.

"Efficient LiNdP4012 lasers pumped with a laser diode", Applied Optics, vol. 18, No. 23 (Dec. 1, 1979) pp. 3882–3883.

"Efficient and damage-resistant tunable cw dye laser", J. Appl. Phys., vol. 44, No. 6, (Jun. 1973) pp. 2775–2780, Jacobs et al.

"Highly efficient neodymium: yttrium aluminum garnet laser end jumped by a semiconductor laser array", Apply. Phys. Lett. 47(2), (Jul. 15, 1985) pp. 74–77, Sipes.

"The Influence of Whisker Dimensions on the Mechanical Properties of Cordierite/SiC Whisker Composites", Journal of the Eruopean Ceramic Society 9 (1992) pp. 153–163, Wadsworth et al. no month.

"The effect of whisker length on the mechanical properties of alumina-sic whisker composites", Journal of Materials Science 24 (1989) pp. 1589–1593, Baek et al. no month.

SILICON CARBIDE WHISKER REINFORCED CUTTING TOOL MATERIAL

BACKGROUND OF THE INVENTION

The present invention relates to ceramic cutting tool materials particularly useful for machining of heat resistant alloys and particularly to such cutting tool materials in which monocrystalline silicon carbide whiskers are uniformly distributed in an alumina matrix.

U.S. Pat. No. 4,543,345 (Wei) discloses a material comprising a matrix selected from the group consisting of alumina, mullite and B$_4$C having homogeneously dispersed therein 5–60 vol % of silicon carbide whiskers said silicon carbide whiskers having a micro-crystalline structure and a size range of about 0.6 μm in diameter and a length of 10–80 μm with an average aspect ratio (length/diameter) of 75. Similar values are found in U.S. Pat. No. 4,961,757 (Rhodes). The latter patent discloses that these materials are useful for metal cutting.

It is generally understood that a high aspect ratio promotes the toughening mechanisms crack bridging and pull-out. See Baeck and Kim, "The Effect of Whisker Length on the Mechanical Properties of Alumina-SiC-Whisker Composites", *J Of Mat Sci* 24 (1989), p. 1589–1593; and Wadsworth and Stevens, "The Influence of Whisker Dimensions on the Mechanical Properties of Cordierete/SiC Whisker Composites", *J of The European Cer Soc* 9 (1992), p. 153–163.

OBJECTS AND SUMMARY OF THE INVENTION

It is an object of this invention to avoid or alleviate the problems of the prior It is further an object of this invention to provide ceramic cutting tool materials particularly useful for machining of heat resistant alloys and particularly to such cutting tool materials in which monocrystalline silicon carbide whiskers are uniformly distributed in an alumina matrix.

In one aspect of the invention there is provided an oxide based ceramic cutting insert for chipforming machining of heat resistant alloys comprising an alumina based matrix and 5–50% by volume of homogeneously dispersed whiskers of silicon carbide wherein substantially all of the whiskers have a length less than 10 μm.

In another aspect of the invention there is provided a method of producing an oxide based ceramic cutting insert for chipforming machining of heat resistant alloys comprising an alumina based matrix and 5–50% by volume of homogeneously dispersed whiskers of silicon carbide by forming a mixture comprising alumina, sintering additives and grain growth inhibitors and 5–50% by volume of silicon carbide whiskers, wherein substantially all of the silicon carbide whiskers in said mixture have a length less than 10 μm.

In another aspect of the invention there is provided a method of cutting metal wherein a curing tool is brought into contact with a metal workpiece and the cutting tool and metal workpiece move relative to each other whereby metal is removed by the cutting tool from the metal workpiece, the improvement comprising using an oxide based ceramic cutting insert comprising an alumina based matrix and 5–50% by volume of homogeneously dispersed whiskers of silicon carbide wherein substantially all of the whiskers have a length less than 10 μm.

DETAILED DESCRIPTION OF THE PREFERRED EMBODIMENTS OF THE INVENTION

It has now surprisingly been found that substantially smaller aspect ratios in the order of 10 give advantageous behavior when using the composite material as cutting tools for machining heat resistant alloys.

The ceramic cutting tool material according to the present invention comprises an alumina based matrix with 10–50%, preferably 15–45% by volume of homogeneously dispersed whiskers based upon silicon carbide. The average alumina grain size is less than 5 μm and typically in the order of 2 μm.

The diameter of the whiskers is less than 1 μm, preferably 0.4–0.7 μm and their average length is preferably 4–7 μm (average aspect ratio about 10) with a standard deviation of 2–5 μm, preferably about 4 μm. Alternatively, substantially all of the whiskers have a length less than 10 μm. By "substantially all" is meant that at least 95%, preferably at least 98%, most preferably at least 99%, of the whiskers have a length less than 10 μm.

Alternatively, the alumina matrix further contains up to 20 vol % ZrO$_2$. This addition of zirconia may add further toughening to the material as described in U.S. Pat. No. 4,657,877.

According to the present invention, the ceramic composites are prepared by mixing alumina powder and conventional sintering additives and grain growth inhibitors with monocrystalline SiC whiskers with any suitable mixing technique.

After drying, the mixture is hot pressed or hot isostatically pressed to a density at least 99% of theoretical density.

The aspect ratio of the whiskers is not very much affected by the mixing technique and the hot pressing operation although it is expected that at least the longer whiskers will be broken. The desired aspect ratio of the whiskers can be adjusted by premilling of the whiskers prior to mixing with alumina. The aspect ratio of commercial SiC whiskers are normally much higher than 10. However, such premilling can be used to break the whiskers and thus reduce the aspect ratio. Premilling conditions can be adjusted in accordance with known techniques to produce suitable whiskers.

The invention is additionally illustrated in connection with the following Examples which are to be considered as illustrative of the present invention. It should be understood, however, that the invention is not limited to the specific details of the Examples.

EXAMPLE 1

Alumina-30 vol % SiC whisker composites with different length of the whiskers were produced by the following procedure. The raw materials used are listed in Table 1.

TABLE 1

| Raw materials used | | | |
|---|---|---|---|
| Material | Manufacturer | Manufacturer's Designation | Particle Size (diameter) (μm) |
| Al$_2$O$_3$ | Alcoa | A16 SG | 0.5 |
| SiC$_w$* | ACMC | Silar SC9 | 0.5 |
| MgO | Merck & Co | | <1 |

TABLE 1-continued

| | Raw materials used | | |
|---|---|---|---|
| Material | Manufacturer | Manufacturer's Designation | Particle Size (diameter) (μm) |
| $Y_2O_3$ | HC Starck | | 3.5 |

*The whisker raw material contains 80-90% whiskers with the rest being formed of mainly small, submicron silicon carbide particulates.

The whisker lengths of the raw material and after the different milling steps were measured after dispersion of the whiskers at a low concentration in an ammonia solution and subsequently drying on a specimen holder. SEM micrographs were then analyzed manually in a Quantimet 570 picture analyzer from Cambridge Instruments.

The composition was kept constant for all variants at 25 weight % $SiC_W$ and 0.1 weight % MgO and $Y_2O_3$ respectively. All compositions were hot pressed at 1825° C. for 100 min at 25 MPa to discs of diameter 80 mm.

Table 2 shows the premilling times that were used for the evaluation of varying aspect ratio on cutting performance and corresponding whisker lengths.

TABLE 2

| | Premilling | Premilling times Whisker Length, μm | | | Diameter, μm |
|---|---|---|---|---|---|
| Variant | h | Median | Mean | Std dev | Mean |
| A | 0 | 23.0 | 28.2 | 23.1 | 0.54 |
| B | 4 | 5.8 | 6.4 | 4.0 | 0.54 |
| C | 18 | 4.2 | 5.9 | 3.8 | 0.54 |
| D | 72 | 2.7 | 2.9 | 1.3 | 0.54 |

The sintered materials were characterized with respect to density, hardness, fracture toughness and fracture strength. Hardness and toughness were measured using a Vicker's indentation with a 10 kg load. All measurements were performed on the plane perpendicular to the hot pressing direction. Fracture toughness was calculated according to the formula $$K_{1c} = 0.0824 \frac{P}{c^{3/2}}$$

where
p = the force in N and
c = the crack length after the indentation.

The fracture strength was measured in a three point bending test. Mean fracture stress was calculated from 9 specimens 13.3×3.5×2.0 mm, span 9 mm, load rate 50 N/s. The measured values can be found in Table 3.

TABLE 3

| | Density, hardness, fracture toughness and fracture strength. | | | |
|---|---|---|---|---|
| Variant | Density g/cm³ | Hardness HV | Fracture Toughness MPam$^{\frac{1}{2}}$ | Fracture Strength MPa |
| A | 3.74 | 1850 | 4.9 | 1042 |
| B | 3.75 | 1890 | 4.8 | 1056 |
| C | 3.75 | 1910 | 4.6 | 1066 |
| D | 3.75 | 1920 | 3.8 | 846 |

EXAMPLE 2

The materials were tested in metal cutting operations. For this purpose inserts with ISO designation RNGN 120400 T01020 were produced from the hot pressed discs.

Two kinds of turning tests were performed; one DOC(Depth of cut) notch resistance test and one toughness test.

The DOC notch resistance test was conducted by wet turning on a cylindrical Inconel 718 bar, using the following data:
Feed rate=0.15 mm/rev
Cutting speed=250 m/min
Depth of cut=1.5 mm The toughness test was performed dry using a steel (SS 2242) plate workpiece. The shape in combination with an increasing feed rate results in fracture. The time until fracture is a measure of the toughness of the cutting tool material. The turning data was:
Feed rate=0.1 mm/rev, increased 0.1 mm/rev every minute
Cutting speed=90 m/min
Depth of cut=1.5 mm Results from the cutting tests can be found in table 4.

TABLE 4

| | DOC notch wear resistance and toughness behavior in metal cutting | |
|---|---|---|
| Variant | DOC Notch Wear Resistance time to 2 mm notch | Toughness median time to fracture |
| A | 15 | 0.51 |
| B | 17 | 0.65 |
| C | 11 | 0.46 |
| D | 6 | 0.26 |

From the tests it can be concluded that variant B is slightly more wear resistant and shows a better toughness behavior than variant A with unmilled whiskers. Too much milling reduces both wear resistance and toughness behavior.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An oxide based ceramic cutting insert for chip-forming machining of heat resistant alloys comprising an alumina based matrix and 5-50% by volume of homogeneously dispersed whiskers of silicon carbide wherein at least 95% of the whiskers have a length less than 10 μm.

2. The oxide based ceramic cutting insert of claim 1 wherein the average length of the whiskers is about 4-7 μm.

3. The oxide based ceramic cutting insert of claim 1 wherein the matrix further contains up 20 vol % $ZrO_2$.

4. The oxide based ceramic cutting insert of claim 1 wherein said whiskers have a diameter less than 1 μm.

5. The oxide based ceramic cutting insert of claim 4 wherein said whiskers have a diameter of 0.4-0.7 μm.

6. The oxide based ceramic cutting insert of claim 1 wherein said whiskers have an average aspect ratio of about 10.

7. The oxide based ceramic cutting insert of claim 1 wherein at least 98% of the whiskers have a length less than 10 μm.

8. The oxide based ceramic cutting insert of claim 7 wherein in at least 99% of all the whiskers have a length less than 10 μm.

9. A method of producing an oxide based ceramic cutting insert for chipforming machining of heat resistant alloys comprising an alumina base matrix and 5–50% by volume of homogeneously dispersed whiskers of silicon carbide, the method comprising forming a mixture comprising alumina, sintering additives and grain growth inhibitors and 5–50% by volume of silicon carbide whiskers, wherein at least about 95% of the silicon carbide whiskers in said mixture have a length less than 10 μm and sintering the mixture.

10. The method of claim 9 wherein the average length of the whiskers is about 4–7 μm.

11. A method of cutting metal, the method comprising contacting a metal workpiece with a cutting tool and moving the cutting tool and metal workpiece relative to each other so that metal is removed from the metal workpiece by the cutting tool, the cutting tool comprising an oxide based ceramic cutting insert comprising an alumina based matrix and 5–50% by volume of homogeneously dispersed whiskers of silicon carbide wherein at least about 95% of the whiskers have a length less than 10 μm.

12. The method of claim 11 wherein said composite contains 15–45% by volume of said whiskers.

13. The method of claim 11 wherein the average length of the whiskers is about 4–7 μm.

14. The method of claim 9, wherein at least 99% of the whiskers have a length less than 10 μm.

15. The method of claim 11, wherein at least 99% of the whiskers have a length less than 10 μm.

* * * * *

UNITED STATES PATENT AND TRADEMARK OFFICE
CERTIFICATE OF CORRECTION

PATENT NO. : 5,449,647
DATED : September 12, 1995
INVENTOR(S) : Gunnar Brandt

It is certified that error appears in the above-indentified patent and that said Letters Patent is hereby corrected as shown below:

Title page, item [30] Foreign Application Priority data: delete "[DE] Germany" and insert therefor --[SE] Sweden--.

Signed and Sealed this

Twelfth Day of December, 1995

Attest:

BRUCE LEHMAN

Attesting Officer         Commissioner of Patents and Trademarks